Dec. 5, 1950     J. E. G. EURICH ET AL     2,532,700

ELECTRIC MOTOR AND GENERATOR

Filed Nov. 19, 1946     2 Sheets—Sheet 1

INVENTORS:—
JOE EMIL GEORGE EURICH
JAMES VICTOR EURICH

BY THEIR ATTORNEY:—

*Walter Gwinn*

OPEN RING ARMATURE

Patented Dec. 5, 1950

2,532,700

UNITED STATES PATENT OFFICE 2,532,700

ELECTRIC MOTOR AND GENERATOR

Joe Emil George Eurich, Manchester, and James Victor Eurich, Bolton, England

Application November 19, 1946, Serial No. 710,787
In Great Britain November 23, 1945

8 Claims. (Cl. 172—36)

This invention relates to electric machines, both motors and generators, having a stator and a rotor. Examples of uses of the invention, are as a motor for the working of small models, cine cameras, projectors and other scientific equipment, and low powered devices such as windscreen wipers for motor vehicles and as a lighting generator for bicycles.

In such machines there are essentially two main parts between which relative movement is a functional necessity, one of which parts is usually stationary and the other rotary, the terms stator and rotor being properly used to describe respectively the stationary and the rotary parts. From an electro-technical aspect, however, in any such machine the two main parts are the armature and field system either of which may be arranged to rotate whilst the other is stationary, or as is also known, both parts may rotate so long as the functional necessity for relative rotation is provided. For simplicity of description, therefore, it is to be understood that the terms stator and rotor are used herein in their broad complementary sense to denote the two main parts of the machine.

The invention consists in an electric machine having two main parts herein termed the stator and rotor respectively in which one such part is a magnet and the other such part is a ring winding on a core of magnetic material in one length or divided into one length for each pair of poles in the magnet leaving a gap between adjacent ends of both the winding and the core, such winding having at least one portion of its conductor exposed so as to be engaged by brushes and so that such exposed portion of the winding and the brushes respectively constitute a commutator and collectors for the machine.

In convenient embodiments of the invention the winding is on a ribbon-like core of magnetic material and of flat cross section and has a concentric exposed portion of the conductor on each edge. In some cases one edge only may be adapted for brush contact. Such an arrangement, i. e. with edge-contact on a flat section winding lends itself to extreme simplicity of construction, a motor for example consisting solely of a permanent ring magnet, a circular flat section ring winding of an insulated conductor on a core of magnetic material with the insulation removed at one or both edges, a bobbin or support for the circular winding with projecting spindle ends, and end plates to enclose such winding and support the bobbin by its spindle ends within the magnet, one or both the end plates having a brush contact or brush contacts to engage the adjacent exposed edge of the circular winding and arranged in the required relation to the magnetic field of the permanent ring magnet so as to produce a torque on the bobbin. Thus the use of a separate commutator as generally known is rendered unnecessary.

According to a further feature of the invention, when a permanent magnet is employed, and where the brushes are located between the magnet and the winding, the magnet may have a slot or recess (e. g. of annular form) in which the brushes are mounted, so as to allow of a larger rotor (or smaller stator) and thereby reduce the air gap between them.

Figures 1, 2, 3:
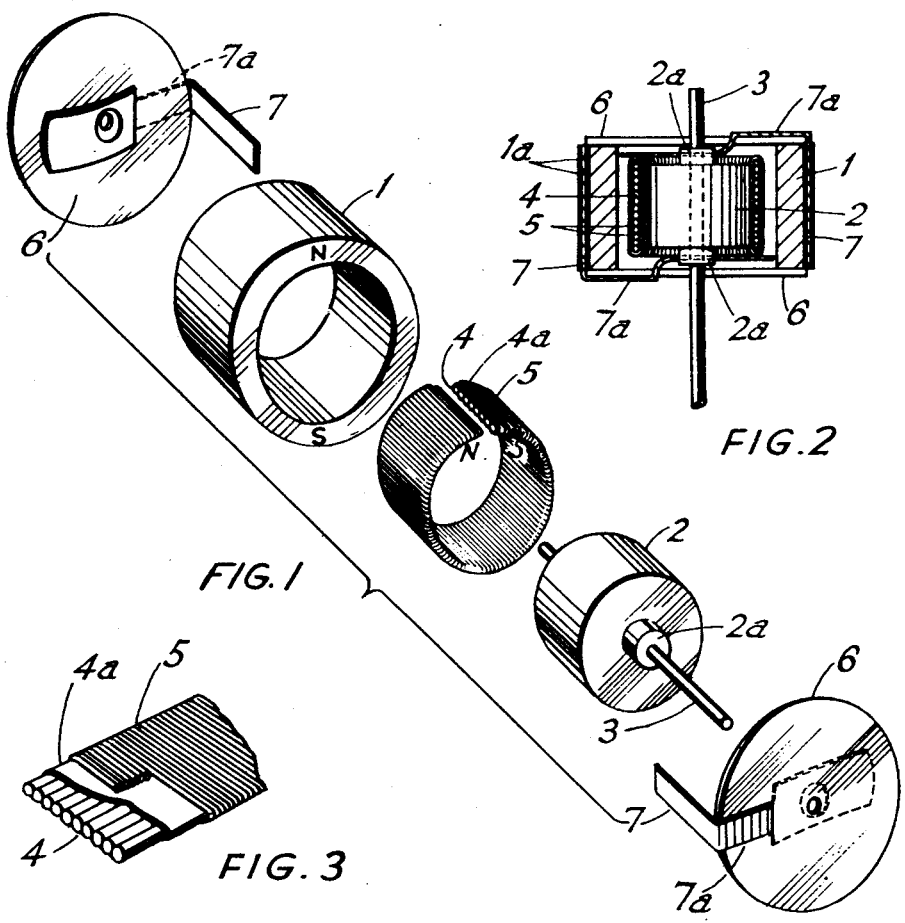
Fig. 1 is an exploded view of an electric motor according to one example of the invention.
Fig. 2 is a transverse vertical section through the assembled motor.
Fig. 3 is a part-sectional perspective view (to a larger scale) of a length of one example of the wound core used in the construction of Figs. 1 and 2 before being bent to circular form.

Referring first to Figs. 1-3, there is a permanent ring magnet 1, which may be of say 1" outside diameter, and may be made of any magnetic alloy of high coercivity, and within such magnet is a co-axial cylindrical bobbin 2 of non-conductive and non-magnetic material such as wood or synthetic resin, on a spindle 3, both ends of which project beyond the bobbin. The bobbin 2 is surrounded by a circular winding in which there is a flat-sectioned core assembly consisting of a plurality of soft iron wires 4 arranged side-by-side and enclosed in an envelope or casing 4a of insulating material such as a cellulose tissue secured by an adhesive, around which are wrapped turns of enamelled copper wire 5 in a single layer. The functions of the envelope or covering are to protect the insulation of the wire from abrasion by, and contact with, the core assembly and at the same time to unite the wires in strip-like form to facilitate the operation of winding. The winding operation is effected as a continuous process on a straight core and the wound core may subsequently be dipped in shellac or other suitable material and then may be baked. Preferably a shellac is used which will permit bending into circular form without cracking.

From the continuous wound strip a pre-determined length is cut, and such length is then bent into circular form with the ends of the core and winding separated by a gap, as shown in Fig. 1, to be mounted on the bobbin 2. The shellac, previously applied to the winding, gives added insulation, extra resistance to abrasion and binds the turns to prevent unwinding of the wire at the ends of the cut lengths and to prevent slipping and displacement of the turns during bending and subsequent manipulation. Obviously the shellac could be applied by other methods than dipping, or any other suitable binding medium could be used. A portion of the insulation is removed from both of the edges without removing the insulation from between adjacent turns, to provide concentric exposed areas for contact with the brushes.

The size of the gap between the ends of the circular winding has an important bearing on the performance of the machine as a motor, both in regard to efficiency and self-starting properties, and in this particular example a suitable gap for the core, with a rotor of ½" external diameter, has been found to be $\frac{3}{32}$ of an inch. During early experiments, and before the effect of the size of this gap had been fully appreciated, difficulty had been experienced in obtaining adequate efficiency and certainty at all times of self-starting. The width of the brushes must be such as to bridge the gap in the winding and this latter gap need not necessarily be the same as that in the core. The gap in the winding will usually be slightly greater than the gap in the core as a few turns of wire will be stripped off at each end in order to reduce any possibility of short circuit between the end of the winding and the end of the core. The magnet is magnetised so as to have two poles, as indicated in Fig. 1, whilst the circular winding produces two poles in the core 4 as also indicated in Fig. 1. The proportions of the parts are such that a minimum air-gap is left between the circular winding and the magnet.

Secured to the sides or edges of the magnet, and fitting on to the projecting ends of the spindle 3, are two end-plates or covers 6 of insulating material, to each of which is secured a brush 7, made from a thin springy conductive material, both being insulated from the magnet. The end-plates are secured to the sides of the magnet 6 by means of a suitable adhesive. The brushes contact the adjacent edges of the winding 5, at diametrically opposite points, the insulation of the wire having been removed at such edges in the path of the respective brushes, but not from between adjacent turns. The brushes 7 are adapted for connection to a source of current.

Each brush 7 comprises a strip enlarged and apertured at one end to fit over and be located by a small boss 2a on the end of the bobbin 2. The narrower part of the brush passes through a slot in the adjacent end-plate 6 where it is cranked for that purpose and its outer end is then folded to lie over a band 1a of insulating material which has previously been wrapped around the magnet. The wrapping of such insulating material is continued around the magnet to secure the brushes. The brushes have short exposed parts 7a with which electrical connection to a battery may be made. The brushes are of thin flexible brass foil and are each adapted to make contact simultaneously with the uninsulated portions of the adjacent edge of the circular winding over several consecutive turns and in diametrically-opposite positions at the opposite sides of the circular winding.

By connecting the brushes in a circuit from a battery, the circular winding is excited, generating magnetic poles in the rotor, and rotation ensues, the successive turns of the circular winding engaging the brushes, and the gap between the abutting ends of the circular winding passing the brushes in succession so as repeatedly to reverse the polarity in the said winding, in accordance with known motor practice. Due to the gap between the ends of the circular winding, only one half of it is excited at one time except momentarily when a brush bridges the gap.

The magnet itself may be enclosed in a casing, and in any event may be adapted for insertion into a socket or other holder with complementary contacts in series with the current source.

Figure 4:
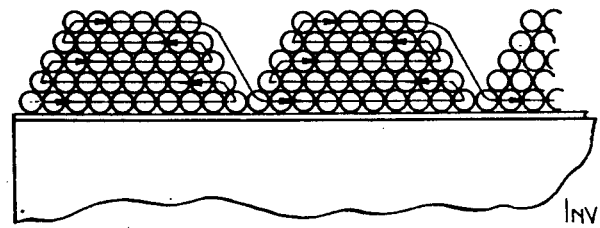
Fig. 4 is a similar view to Fig. 3, also to a larger scale, showing one alternative method of building up the winding.

Referring now to Fig. 4, in making the winding according to this form, the wire is applied to the core assembly by winding alternately forward and backward with periodic advancement in such a way as to produce a series of interconnected groups of turns having a cross section on each side of the core of a truncated pyramidal form as shown. In making up such a winding for incorporation in the machine described above the required length, which will contain for example ten groups of turns, is cut off and bent into circular form and mounted upon the bobbin.

Whilst the examples above described refer to machines having a two pole magnet with diametrically opposed poles, it will be obvious that the invention is applicable to the construction of multi-polar machines. In a multi-polar construction the pitch or spacing of the magnet poles will determine the pitch or spacing of the brushes and of the gaps in the winding and core, that of the brushes being the same as that of the poles, while that of the gaps will be double or equal to the pitch of pairs of poles. For example, in a four pole machine having a ring magnet with four equally spaced poles (two north and two south) there may be two or preferably four brushes set at 90 degrees to each other and there will be two substantially semicircular segments of wound core giving two diametrically opposed gaps.

Figure 5:
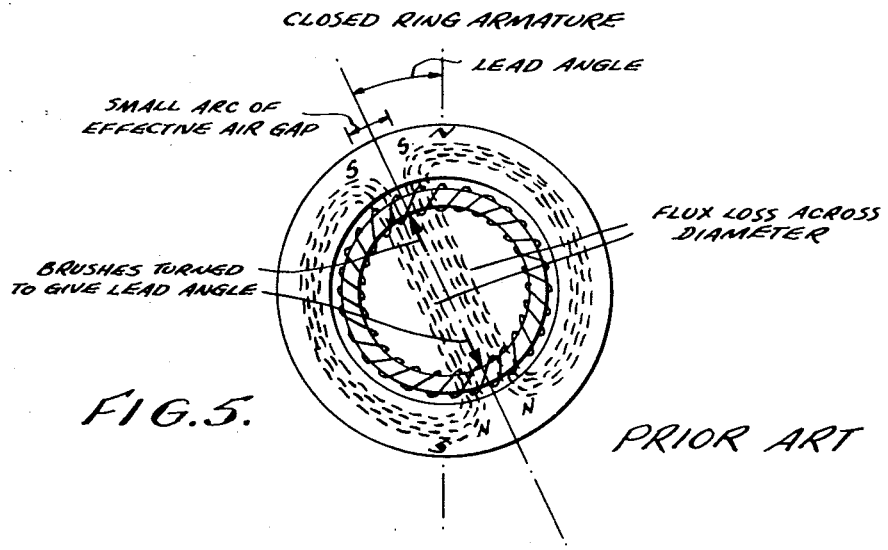
Figs. 5 and 6 are diagrams for an explanation of the present invention.

In the old gap-less gramme ring type motors shown in Fig. 5, like magnetic poles are generated at the electrically created ends of the halves of the ring. There will of course be a substantial flux leakage across the diameter of the ring armature while the effective area of the air gap between the armature and the ring magnet will be small, each half of the armature opposing the flux from the other half. The external flux is only effective in relation to the angle of lead between the armature and field poles.

Figure 6:
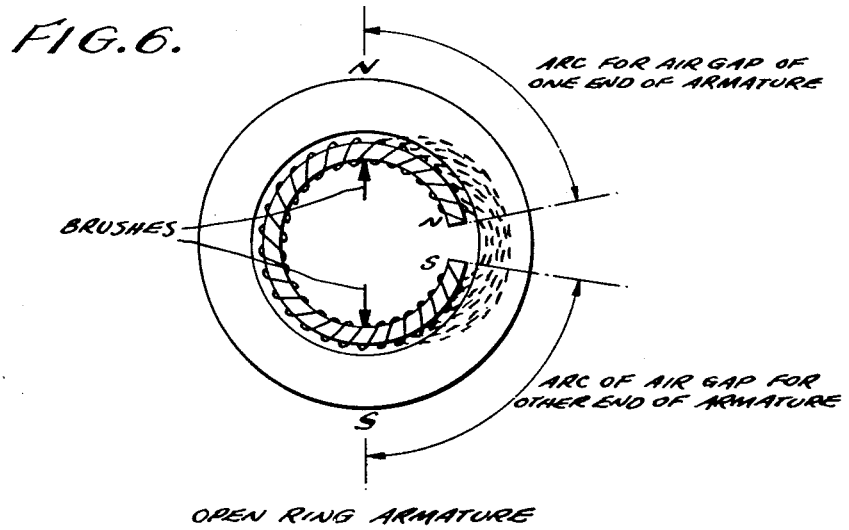

On the other hand, where a gap is provided as proposed by the invention and only one half of the armature is energized as shown in Fig. 6, there is always a larger arc of air gap. Consequently, the reluctance of the air gap is considerably reduced and the effect of the thickness of the air gap on efficiency is also much reduced. This is important with a ring wound rotor because the air gap is of course between the iron core and the magnet and the windings have to be located in such space. It is therefore an unavoidable factor in a machine having a ring wound rotor that the air gap is much larger than in other conventional forms, and therefore the provision of the gap in the armature core and the break in the electric winding must and does in fact lead to an increase in the efficiency of a machine having a ring-wound rotor.

Machines in accordance with the invention herein described and claimed are particularly suitable for use with low voltages and small outputs and such machines can effectively be made of much smaller dimensions than has hitherto been practicable.

What we claim is:

1. An electric machine comprising a magnet, a ring-wound core of magnetic material for co-operation with said magnet, said core and its winding being gapped to provide a separate C-shaped armature assembly for each pair of magnet poles, the winding being bared from end to end of such assembly to provide a commutator track, at least one pair of brushes for engagement with said track and supporting means providing for relative rotation of said magnet and ring-wound core.

2. An electric machine comprising a magnet, a ring-wound magnetic core built up of wires arranged side-by-side, said core and its winding being gapped to provide a separate C-shaped armature assembly for each pair of magnet poles, the winding being bared from end to end of such assembly to provide a commutator track, at least one pair of brushes for engagement with said track and supporting means providing for relative rotation of said magnet and ring-wound core.

3. In an electric machine including relatively rotatable magnet and armature elements and brushes for conveying current to and from said armature, an armature comprising a magnetic core of ribbon-like form and a conductor wound upon said core whilst the latter is flat, the wound core being bent into the form of a ring which is gapped to provide a separate C-shaped assembly for each pair of magnet poles and said conductor being bared along at least one edge of each such assembly to provide a commutator track for engagement by the brushes.

4. In an electric machine including relatively rotatable magnet and armature elements and brushes for conveying current to and from said armature, an armature comprising a magnetic core of ribbon-like form, an insulated conductor wound upon said core whilst the latter is flat and an envelope of non-conductive material applied to said core prior to the winding on of said conductor to prevent the insulation of the latter from contact with said core, the wound core being bent into the form of a ring which is gapped to provide a separate C-shaped assembly for each pair of magnet poles, and said conductor being bared along at least one edge of each such assembly to provide a commutator track for engagement by the brushes.

5. In an electric machine including relatively rotatable magnet and armature elements and brushes for conveying current to and from said armature, an armature comprising a plurality of wires arranged side-by-side to form a magnetic core of ribbon-like form, an insulated conductor wound upon said core whilst the latter is flat and an envelope of non-conductive material applied to said core prior to the winding on of said conductor to unite together the constituent wires of said core and to prevent the insulation of said conductor from contact therewith, the wound core being bent into the form of a ring which is gapped to provide a separate C-shaped assembly for each pair of magnet poles and said conductor being bared along at least one edge of each such assembly to provide a commutator track for engagement by the brushes.

6. An electric motor comprising a permanent magnet of annular form, an annular armature core of flat section, an insulated conductor ring-wound upon said core and bared along one edge of the latter to provide a commutator track, an internal support for said core, coaxial spindle ends associated with said support, plates closing the ends of said magnet and apertured to receive said spindle ends so that said armature core is mounted in concentric relation with said magnet and a brush contact engaging said commutator track and mounted upon the adjacent end plate, said brush contact being arranged in such relation to the field of said magnet that a torque is imparted to said armature support.

7. An electric motor comprising a permanent magnet of annular form, an armature core of ribbon-like form, an insulated conductor wound from end to end of said core whilst the latter is flat and with its turns transverse to the length thereof, the wound core being bent into the form of a ring which is gapped to provide a separate C-shaped assembly for each pair of magnet poles, said conductor being bared along one edge of each such assembly to provide a commutator track, an internal support for said core, coaxial spindle ends associated with said support, plates closing the ends of said magnet and apertured to receive said spindle ends so that said armature core is mounted in concentric relation with said magnet, and a brush contact engaging said commutator track and mounted upon the adjacent end plate, said brush contact being arranged in such relation to the field of said magnet that a torque is imparted to said armature support.

8. An electric motor comprising a permanent magnet of annular form, an annular armature core of flat section, an insulated conductor ring-wound upon said core and bared along one edge of the latter to provide a commutator track, an internal support for said core, coaxial bosses at opposite ends of said support, coaxial spindle ends projecting from said bosses, plates closing the ends of said magnet and apertured to receive said spindle ends so that said armature core is mounted in concentric relation with said magnet, a flexible conductive strip engaging said commutator track in the manner of a brush and mounted in the adjacent end plate, said strip being located by engagement of the adjacent support boss in an aperture therein, in such relation to the field of said magnet that a torque is imparted to said armature support, whilst a portion of said strip forming an external contact is secured to the exterior of said magnet and insulated therefrom.

JOE EMIL GEORGE EURICH.
JAMES VICTOR EURICH.

REFERENCES CITED

The following references are of record in the file of this patent:

UNITED STATES PATENTS

| Number | Name | Date |
| --- | --- | --- |
| 516,553 | Sayers | Mar. 13, 1894 |
| 2,334,153 | Wilson | Nov. 9, 1943 |
| 2,449,021 | Stahl | Sept. 7, 1948 |